United States Patent [19]

Wössner

[11] 4,270,635
[45] Jun. 2, 1981

[54] SHOCK ABSORBER FOR VEHICLES

[75] Inventor: Felix Wössner, Schweinfurt, Fed. Rep. of Germany

[73] Assignee: Fichtel & Sachs AG, Schweinfurt, Fed. Rep. of Germany

[21] Appl. No.: 27,355

[22] Filed: Apr. 5, 1979

[30] Foreign Application Priority Data

Apr. 13, 1978 [DE] Fed. Rep. of Germany ... 109883[U]

[51] Int. Cl.³ .............................................. F16F 9/32
[52] U.S. Cl. .................................................. 188/322
[58] Field of Search ............ 267/64 R, 124; 188/284, 188/322

[56] References Cited

U.S. PATENT DOCUMENTS

| | | | |
|---|---|---|---|
| 2,107,494 | 2/1938 | Onions et al. | 267/68 R |
| 2,735,132 | 2/1956 | Wartian | 188/284 X |
| 3,625,321 | 12/1971 | Lutz | 188/322 |
| 3,944,197 | 3/1976 | Bachicourt | 267/64 R |
| 4,078,778 | 3/1978 | Hubweber | 267/124 X |

FOREIGN PATENT DOCUMENTS

| | | | |
|---|---|---|---|
| 2144795 | 3/1973 | Fed. Rep. of Germany | 267/64 R |
| 2324209 | 11/1974 | Fed. Rep. of Germany | 188/322 |
| 7519269 | 6/1975 | Fed. Rep. of Germany . | |
| 1447295 | 8/1976 | United Kingdom . | |

Primary Examiner—George E. A. Halvosa
Attorney, Agent, or Firm—Toren, McGeady and Stanger

[57] ABSTRACT

In a shock absorber for a vehicle, a piston rod extends through a piston rod guide into a cylinder and its end within the cylinder is attached to a damping piston. A stop assembly is mounted on the piston rod close to the damping piston and spaced from the piston rod guide. The stop assembly includes an axially extending sleeve laterally enclosing the piston rod. The end of the sleeve can be secured directly to the piston rod or a support device can be secured to the piston rod and disposed in contact with the end of the sleeve. When the piston rod is displaced relative to and out of the cylinder, the stop assembly contacts the piston rod guide. The piston rod can be a solid rod member or a tubular member with solid end connections.

13 Claims, 6 Drawing Figures

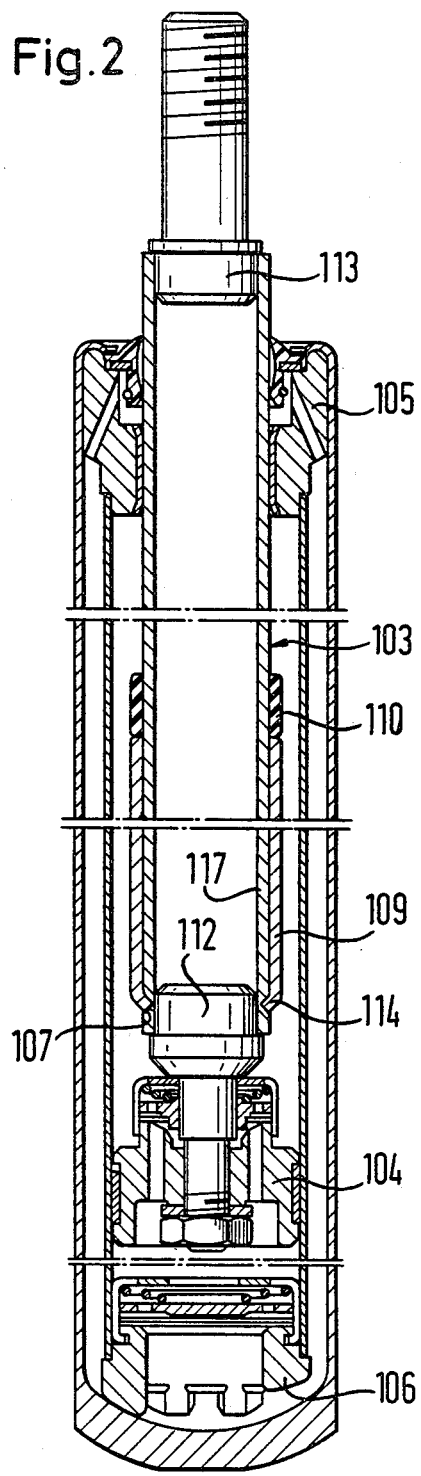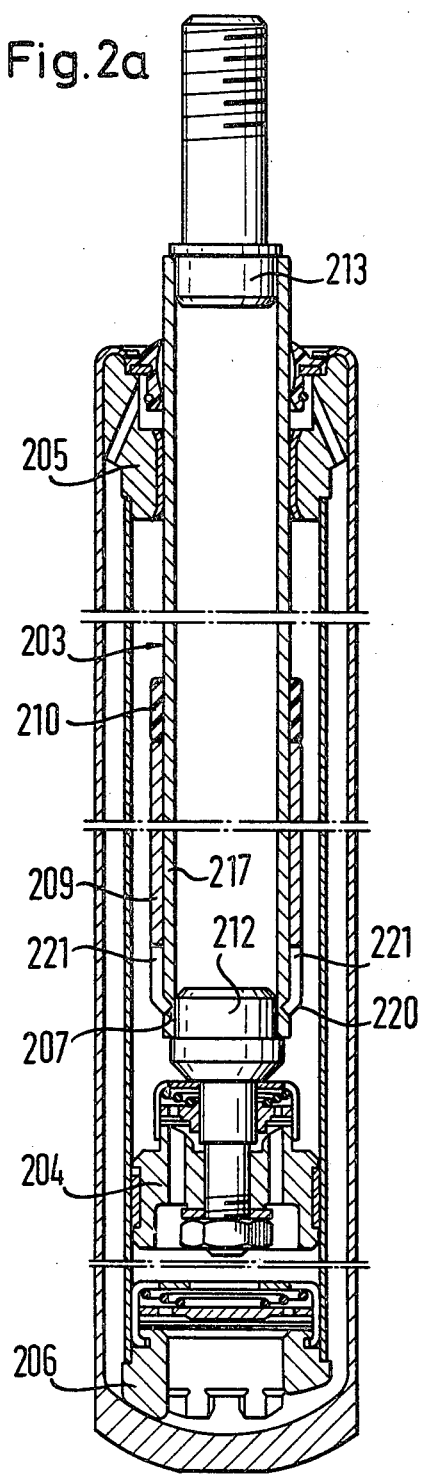

SHOCK ABSORBER FOR VEHICLES

SUMMARY OF THE INVENTION

The present invention is directed to a shock absorber for a vehicle and includes a cylinder with a piston rod guide in one end of the cylinder and a piston rod extending into the cylinder through the piston rod guide. Within the cylinder, a damping piston is attached to the end of the piston rod and a stop device is secured on the piston rod adjacent the damping piston and includes a spacer sleeve. When the piston rod is displaced out of the cylinder the stop device contacts the piston rod guide.

Shock absorbers of this type having relatively thick piston rods are suited to receive wheel guide forces, particularly when they are used in shock-absorbing struts. To ensure problem-free operation when transverse forces are transmitted, the shock absorbers are equipped with a stop device which is effective in the pulling or displacement direction of the piston rod. Such stop devices ensure that the distance between the piston rod guide and the damping piston does not fall below a minimum to guarantee the necessary support length for the piston rod. Depending on the design and the position of the piston rod, the distance between the damping piston and the piston rod guide is 100 to 200 mm. In known stop devices, the support assembly is fixed on the piston rod in a central position between the damping piston and the piston rod guide by welding or by the engagement of a spring ring in a groove formed in the piston rod. In both cases the piston rod is weakened either by the welding action which causes a softening or by the location of the groove which weakens the piston rod where it is subject to high bending stresses. As a result, in the region where the support assembly is fastened to the piston rod, plastic deformation and, finally, failure may occur.

In another known stop device, the spacer sleeve is supported by the piston itself. Such an arrangement may cause deformation of the piston and of specially sensitive parts in the damping portion of the piston so that the damping behavior is affected.

Therefore, it is the primary object of the present invention to avoid the disadvantage experienced in the past and to afford a stop device in the direction in which the piston rod is displaced so that the piston rod is not weakened in the region of high bending stresses and the damping portion of the damping piston is not subjected to forces by the stop device.

In accordance with the present invention, the spacer sleeve of the stop device is supported on the piston rod by a support assembly located adjacent to the damping piston. To space the point of attachment of the support assembly on the piston rod a sufficient distance from the damping piston and, additionally, to ensure adequate stability for the attachment by providing it at a distance from the end of the piston rod, and to avoid weakening the piston rod in the region of high bending stress, it is provided that the transverse plane at which the support assembly is mounted on the piston rod is located less than 15 mm from the damping piston, preferably, at a distance less than 10 mm, with the optimum distance being in the range of 2 to 10 mm.

The design and the assembly of the shock absorber are very simple, since the spacer sleeve is placed on the piston rod and, therefore, can be mounted during the preassembly of the piston and piston rod.

It is possible to stiffen the piston rod by placing the spacer sleeve on the piston rod with an initial tension. The spacer sleeve may be in the form of a tubular member forced onto the piston rod. It is conceivable, however, if no additional stiffening of the piston rod by the tubular sleeve member is required, that the spacer sleeve includes a slot so that it is mounted on the piston rod as a clamping sleeve. The initial tension acting on the spacer sleeve when it is mounted on the piston rod is chosen so that the spacer sleeve, at least in connection with the support assembly, does not move in the axial direction of the piston rod, and, as a result, does not cause any rattling noise.

In one embodiment, the piston rod is constructed as a tubular member having solid connecting pieces fitted into each of its ends and a connecting joint is provided on one end of the piston rod for securing it to the body of a motor vehicle. By using a tubular piston rod, a sufficient weight reduction of the shock absorber is attained.

The shock absorber of the present invention is particularly useful as a part of a shock-absorbing strut for a vehicle.

The various features of novelty which characterize the invention are pointed out with particularity in the claims annexed to and forming a part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWING

In the drawing:

FIG. 2 is an axially extending sectional view through a second embodiment of the shock absorber;

FIG. 2a is an axially extending sectional view through still another embodiment of the shock absorber;

DETAIL DESCRIPTION OF THE INVENTION

Figure 1:
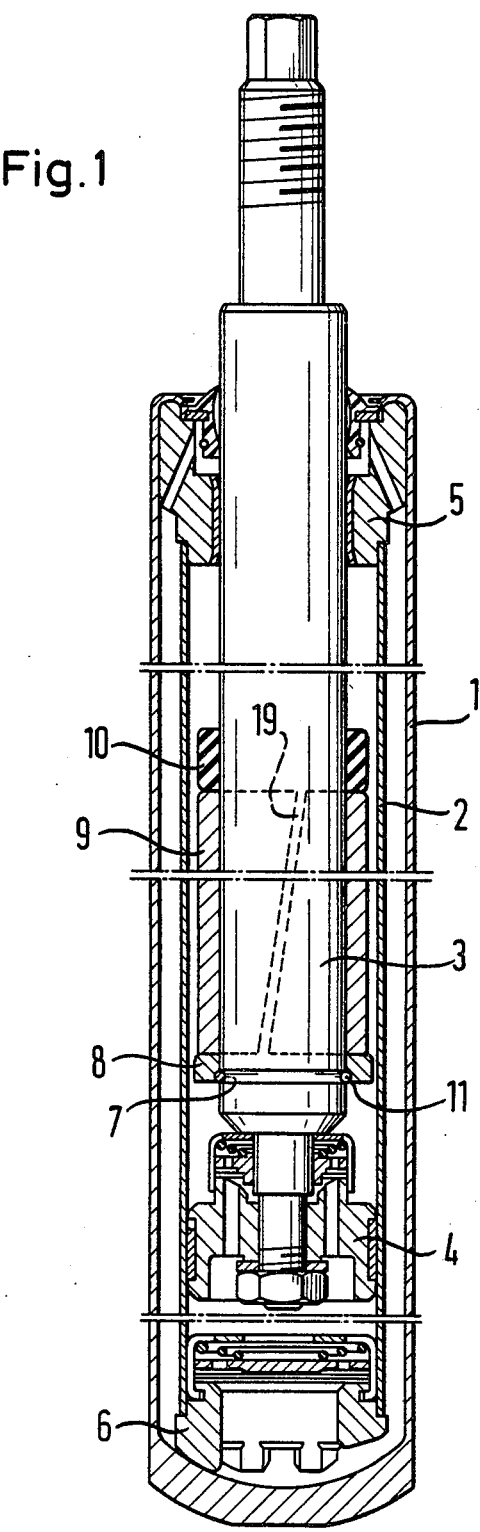
FIG. 1 is an axially extending sectional view through one embodiment of a shock absorber incorporating the present invention.
Figure 5:
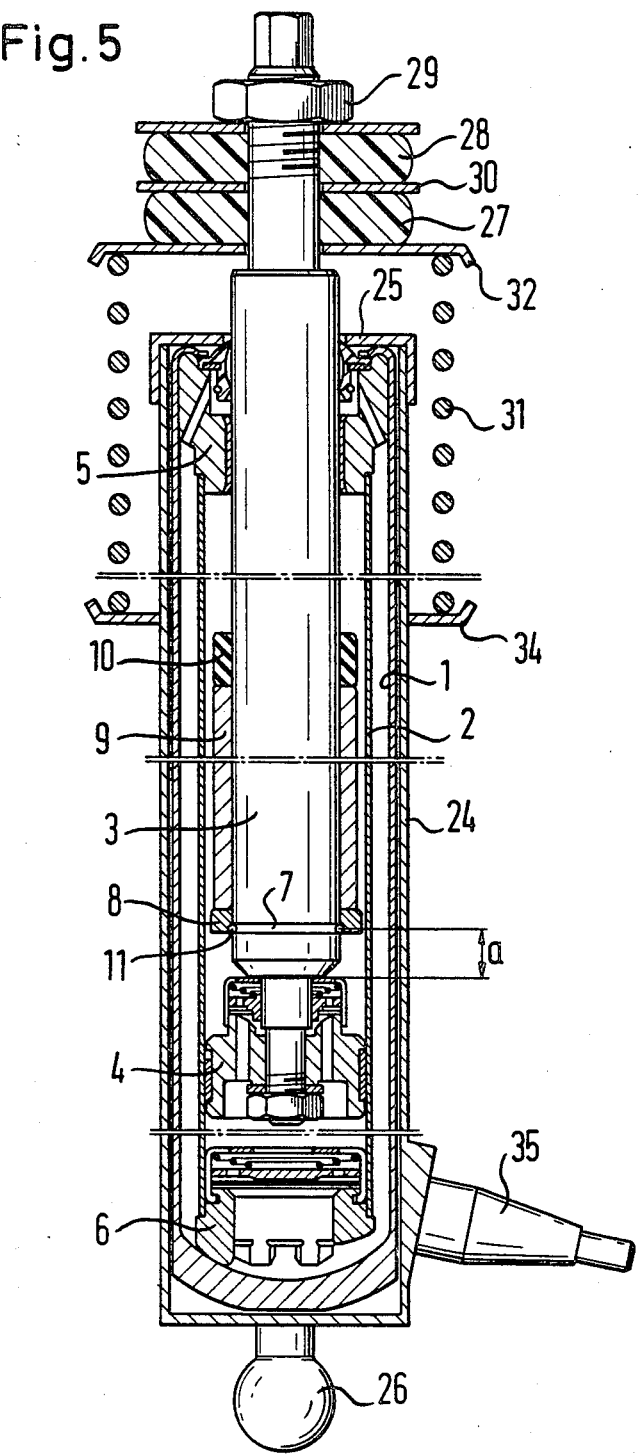
FIG. 5 is an axially extending sectional view of the shock absorber shown in FIG. 1 positioned with a shock-absorbing strut.

In FIG. 1 a shock absorber is illustrated which can be used as an insert for a shock-absorbing strut, note FIG. 5. The shock absorber consists of a cylinder 1 open at its upper end and closed at its lower end. A cylinder 2 is positioned within and spaced inwardly from the cylinder 1 and is connected at its lower end through a bottom valve 6 to the closed bottom of the cylinder 1. At its upper end, cylinder 2 is secured around the lower end of a piston rod guide 5 which is fitted in the upper end of the cylinder 1. A piston rod 3 extends downwardly through the piston rod guide 5 into the interior of the cylinder 2 and, at its lower end, it is secured to a damping piston 4. Adjacent the lower end of the piston rod 3 close to the damping piston, a groove 7 is provided extending circumferentially around the piston rod and a spring ring 11 is seated in the groove. A support ring 8 extends around the piston rod and is fixed in the axial direction by means of the spring ring 11. The support ring 8 has an upwardly facing transverse surface which supports the lower end of a spacer sleeve 9. The spacer sleeve is in contact with and laterally encloses an axial portion of the piston rod within the cylinder 2. At the upper end of the sleeve 9, an elastic stop ring 10 extends circumferentially around the piston rod and rests at its lower transverse face on the spacer sleeve. When the piston rod is displaced, from the position shown in FIG. 1, axially out of the cylinder 2, the stop ring 10 contacts the lower surface of the piston rod guide 5. Accordingly, the support ring 8, spacer sleeve 9, stop ring 10 and spring ring 11 combine to form an elastic stop device which contacts the piston rod guide 5 when the piston rod is displaced or pulled upwardly out of the cylinder 2. Since the spacer sleeve 9 is relatively long, it ensures that the weakened portion of the piston rod resulting from the groove 7 or from some other fastening arrangement, is not arranged in the region of high bending stress in the piston rod. The spacer sleeve 9 may act with initial tension on the piston rod and, thus, affords an additional stiffening action. The spacer sleeve 9, however, may have a longitudinally extending slot 19, note the slot shown in dashed line in FIG. 1, permitting the sleeve to be easily moved onto the piston rod with initial tension.

In FIG. 2, similar parts are designated by the same reference numerals as in FIG. 1, however, a prefix of 1 or 10 is provided each of the reference numerals.

In FIG. 2, piston rod 103 is made up of a tubular section 117 into the lower end of which is connected a solid connecting piece 112 onto which the damping piston 104 is secured. At its upper end, the tubular section 117 is connected to another solid connecting piece 113. In this arrangement the spacer sleeve 109 is fixed directly to the tubular section 117 with the lower end 114 of the spacer sleeve bent inwardly into a groove 107 encircling the end part of the tubular section 117. Such a tubular piston rod results in a significant weight reduction of the shock absorber or of the shock-absorbing strut.

In FIG. 2a, similar parts have the same reference numerals as in FIG. 1, however, each reference numeral has the prefix 20 or 2.

In the arrangement in FIG. 2a, the lower end of the spacer sleeve 209 is slotted in the axial direction providing a number of alternating tongues 200 and slots 221. At their lower ends, the tongues are bent inwardly into engagement with the groove 207 spaced closely from the end of the tubular member.

Figure 3:
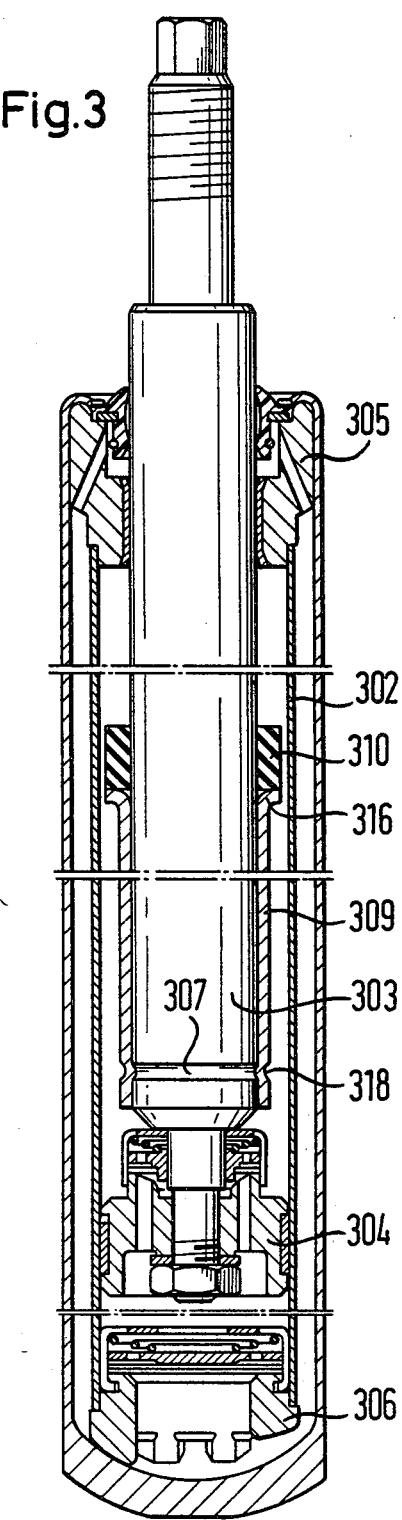
FIG. 3 is an axially extending sectional view of a further embodiment of an inventive shock absorber.

In FIG. 3, similar parts have the same reference numerals as in FIG. 1, with the addition of the prefix 30 or 3.

As distinguished from FIG. 1, in FIG. 3 a sleeve of sheet metal forms spacer sleeve 309 with its upper end 316 flanged outwardly forming a contact surface with elastic stop ring 310. The lower end of the sleeve 309 is rolled into groove 307 formed in and circumferentially around the piston rod. This attachment of the sleeve fixes it in the axial direction relative to the piston rod 303. The rolling engagement can be provided in angularly spaced positions or it can be continuous so that a corrugation 318 is formed in the spacer sleeve.

Figure 4:
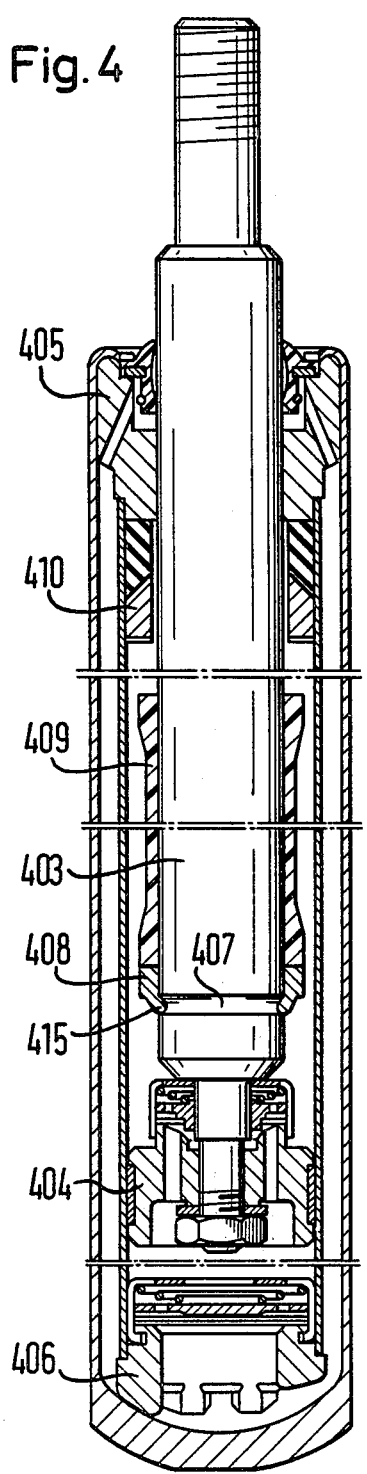
FIG. 4 is an axially extending sectional view through yet another embodiment of the shock absorber.

In FIG. 4 similar parts have the same reference numerals as in FIG. 1, but with the addition of a prefix 40 or 4.

In FIG. 4, a groove 407 extends circumferentially around piston rod 403 in a transverse plane spaced closely from the damping piston 404. A support ring 408 extends around the piston rod 403 immediately above the groove 407 and a downwardly and inwardly extending projection 415 is formed on the support ring and extends into the groove 407 for fixing the support ring on the piston rod. In this embodiment, spacer sleeve 409 is formed of a plastics material so that it fits tightly about the piston rod 403. As a result of this arrangement, rattling noises cannot occur. The elastic stop 410 is fastened to the upper end of the inner cylinder and its upper end is supported by the lower surface of the piston rod guide 405. When the piston rod is displaced upwardly through the piston rod guide 405 out of the cylinder the upper end face of the spacer sleeve 409 contacts the lower surface of the elastic stop 410.

With regard to FIG. 2a it should be noted that the tongues 220 can be bent radially inwardly before the spacer sleeve 209 is slid onto the tubular section 217 of the piston rod, so that the tongues elastically engage within the groove 207.

In FIG. 5, a shock absorber such as shown in FIG. 1 is positioned in a container tube 24 of a shock-absorbing strut. A cover 25 provides a closure for the upper end of the container tube 24. At its lower end the container tube is closed and a joint head 26 is attached to the lower surface of the closed end for connection to part of a vehicle body. The end of the piston rod extending outwardly from the container tube 24 is fastened in an articulated manner to a body portion 30 by means of two rubber buffers 27, 28 and a nut 29. A compression spring 31 extends between a cup spring 32 in contact with the buffer 27 and another cup spring 34 secured around the container tube 24. A steering knuckle 35 is attached to the container tube for mounting a wheel. In this arrangement, it can be easily appreciated that the piston rod is subject to bending stress and that the piston rod is better able to absorb the bending moments the smaller the distance between the annular groove 7 in the piston rod and the damping piston. As shown in FIG. 5, this dimension between the groove and the damping piston is designated by refrence character a.

While specific embodiments of the invention have been shown and described in detail to illustrate the application of the inventive principles, it will be understood that the invention may be embodied otherwise without departing from such principles.

What is claimed is:
1. Shock absorber for vehicles comprising
(a) an axially elongated cylinder having a first end and a second end,
(b) a piston rod guide secured in the first end of said cylinder,
(c) an axially elongated piston rod extending through and guided by said piston rod guide into said cylinder and having a first end located within said cylinder and a second end located outwardly from said piston rod guide in the first end of said cylinder, said piston rod being axially displaceable relative to said cylinder and piston rod guide between two end positions, a first end position in which the first end of said piston rod is close to said second end of said cylinder, and a second end position in which said first end of said piston rod is more remote from said second end of said cylinder than in said first end position,

(d) a damping piston secured to the first end of said piston rod within said cylinder, (e) stop means arranged within said cylinder and located between said damping piston and said piston rod guide, said stop means including
1. an axially elongated rigid sleeve unit coaxial with and closely encircling said piston rod and being tensioned in the circumferential direction for tightly gripping said piston rod, said elongated sleeve unit having a first end closely spaced from said damping piston and a second end more remote from said damping piston and closer to said piston rod guide,
2. said sleeve unit including support means encircling said piston rod at the first end of said elongated sleeve unit for securing said elongated sleeve unit against axial movement relative to said piston rod towards said damping piston,
3. a resilient ring encircling said piston rod and located between the second end of said elongated sleeve unit and said piston rod guide, wherein said piston rod adjacent the first end thereof has a groove formed in and extending around the circumferential surface thereof, said groove being closely spaced from said damping piston in the range of 2 to 10 mm therefrom, said support means including at least one projection formed on said sleeve unit and extending inwardly therefrom into said groove for securing said sleeve unit to said piston rod, and wherein said elongated sleeve unit pushes said resilient ring against said piston rod guide in the second end position of said piston rod, the distance between said damping piston and said piston rod guide being in the range of 100 to 200 mm in said second end position of said piston rod.

2. Shock absorber, as set forth in claim 1, wherein said sleeve unit comprises an axially elongated sleeve and a supporting ring laterally surrounding said piston rod and having an inner surface in contact with said piston rod, said supporting ring having a first end surface and a second end surface each extending transversely of the axial direction of said piston rod with said second end surface spaced further from said damping piston than said first end surface, said first end surface having said projection extending inwardly from the inner surface of said supporting ring and being seated in said groove in said piston rod, and a second end surface forming a support for the first end of said sleeve.

3. Shock absorber, as set forth in claim 1, wherein said groove being annular and said projection being formed in the first end of said sleeve and being deformed inwardly into said annular groove.

4. Shock absorber, as set forth in claim 3, wherein said sleeve has an inner surface in axially extending surface contact with said piston rod and said first end of said sleeve is bent inwardly from the inner surface thereof into the groove in said piston rod.

5. Shock absorber, as set forth in claim 3, wherein said sleeve has a plurality of axially extending slots therein spaced circumferentially apart around said sleeve and extending from the first end toward the second end thereof and forming therebetween a plurality of axially extending tongues with the ends of said tongues closer to said damping piston bent radially inwardly and forming said projection extending into engagement within said groove in said piston rod.

6. Shock absorber, as set forth in claim 1, wherein said sleeve unit comprises a sleeve forming the first end and second end of said sleeve unit, said projection comprising that said sleeve adjacent the first end thereof being rolled inwardly into said annular groove.

7. Shock absorber, as set forth in claim 6, wherein the second end of said sleeve is flanged radially outwardly from said piston rod toward and spaced inwardly from said cylinder, and said resilient ring comprising an annular elastic body encircling said piston rod with one transverse end thereof disposed in contact with the flanged second end of said sleeve.

8. Shock absorber, as set forth in claim 1, wherein said sleeve has a generally axially extending slot formed therein with the slot extending between the ends of said sleeve so that said sleeve can be tensioned when it is placed on said piston rod.

9. Shock absorber, as set forth in claim 1, wherein said sleeve unit is formed of an axially extending tubular section of a plastics material and a support ring at one end of said tubular section and forming the first end of said sleeve unit, and said projection being formed on said support ring.

10. Shock absorber, as set forth in claim 1, wherein said resilient ring bears against the second end of said sleeve unit and said resilient ring extends in the axial direction of said piston rod from said sleeve unit toward and spaced from said piston rod guide when said piston rod is in the first end position so that when said piston rod is displaced out of said cylinder said resilient ring contacts said piston rod guide.

11. Shock absorber, as set forth in claim 1, wherein said resilient ring being mounted on said cylinder in contact with said piston rod and in spaced relation from the second end of said sleeve in the first end position of said piston rod so that when said piston rod is displaced out of said cylinder the second end thereof contacts said resilient ring.

12. Shock absorber, as set forth in claim 1, wherein said piston rod comprises an axially elongated tubular member with a first connecting piece secured to and extending axially from one end of said tubular member and forming the first end of said piston rod, and a second connecting piece secured to and extending axially from the other end of said tubular member and forming the second end of said piston rod.

13. Shock absorber, as set forth in claim 1, including a tubular shaped shock-absorbing strut, said cylinder received within said strut, the second end of said piston rod extending outwardly from said strut, means on the exterior of said strut for mounting a wheel thereon, and said means located on the exterior of said strut so that force acting on said strut can be transmitted to said piston rod.

* * * * *

UNITED STATES PATENT OFFICE
CERTIFICATE OF CORRECTION

Patent No. 4,270,635　　　　　　　　　Dated　June 2, 1981

Inventor(s) Felix Wössner

It is certified that error appears in the above-identified patent and that said Letters Patent are hereby corrected as shown below:

In the heading of the patent [30] should read as follows:

[30]　　Foreign Application Priority Data:

April 13, 1978　Fed. Rep. of Germany....　78 10 988.

Signed and Sealed this

Twenty-fifth Day of August 1981

[SEAL]

*Attest:*

*Attesting Officer*　　　　GERALD J. MOSSINGHOFF
　　　　　　　　　　　　　*Commissioner of Patents and Trademarks*